United States Patent [19]

Kemner

[11] Patent Number: 5,327,476
[45] Date of Patent: Jul. 5, 1994

[54] X-RAY EXAMINATION APPARATUS HAVING MEANS FOR CORRECTING SCATTERED-RADIATION EFFECTS IN AN X-RAY IMAGE

[75] Inventor: Rudolf Kemner, Eindhoven, Netherlands

[73] Assignee: U.S. Philips Corporation, New York, N.Y.

[21] Appl. No.: 44,310

[22] Filed: Apr. 7, 1993

[30] Foreign Application Priority Data

Apr. 8, 1992 [EP] European Pat. Off. ......... 92200998.0

[51] Int. Cl.$^5$ ............................................... H05G 1/64
[52] U.S. Cl. .................................. 378/98.4; 378/98.12
[58] Field of Search ........................... 378/99; 358/111

[56] References Cited

U.S. PATENT DOCUMENTS 4,677,681  6/1987  Klausz .................................. 382/6
4,918,713  4/1990  Honda .................................. 378/99

FOREIGN PATENT DOCUMENTS 0358268 of 0000 European Pat. Off. .

Primary Examiner—Craig E. Church
Attorney, Agent, or Firm—Jack D. Slobod

[57] ABSTRACT

It is known that perturbations caused by scattered-radiation in an x-ray image can be partially avoided by employing a scattered-radiation grid. A device for further improvement of an x-ray image, in that real-time correction of scattered-radiation effects is achieved, is provided according to the invention. Behind x-ray absorbing parts of the scattered-radiation grid only scattered-radiation appears, whereas both scattered-radiation and primary radiation appear behind transparent channels of the scattered-radiation grid. The scattered-radiation grid gives rise to a high-frequency intensity modulation in the x-ray image. From the high-frequency component of the corresponding video signal produced by the x-ray detector, selection signals are generated by a double pulse generator for distinguishing signal amplitudes of the video signal, corresponding to intensities behind absorbing parts and transparent parts, respectively, of the scattered-radiation grid. The selection signals are supplied to a synchronous detector to split the video signal from the x-ray detector into separated video signals corresponding to scattered-radiation and primary radiation and to scattered-radiation only, respectively. A video signal corresponding to a corrected image is obtained by subtraction of the separated video signals.

15 Claims, 2 Drawing Sheets

X-RAY EXAMINATION APPARATUS HAVING MEANS FOR CORRECTING SCATTERED-RADIATION EFFECTS IN AN X-RAY IMAGE

BACKGROUND OF THE INVENTION

1. Field of the Invention

The invention pertains to an x-ray examination apparatus, including an x-ray source, a scattered-radiation grid, an x-ray detector for converting x-ray intensities constituting an x-ray image into a video signal containing information for producing a visible image, which x-ray examination apparatus also includes means for correcting scattered-radiation effects in an x-ray image.

2. Description of the Related Art

An x-ray examination apparatus of said kind is described in the European Patent Application EP 0 358 268.

In the known x-ray examination apparatus, a digital image signal originating from the x-ray detector is converted into an image matrix of intensity values. By convolution of the image matrix with a point spread function a transformed image matrix is formed. A scatter image matrix is formed by multiplication of each matrix element of the transformed image matrix by a weighting factor. For each matrix element of the image matrix a relevant weighting factor is in fact the ratio of a scattered intensity and of a detected intensity. It was recognised in the cited reference that weighting factors are functions of intensity values of the matrix elements of the transformed image matrix. Finally, a corrected image matrix is formed by subtracting matrix elements of the scatter image matrix from corresponding matrix elements of the image matrix.

The x-ray examination apparatus as disclosed in the cited reference has inter alia as a drawback that weighting factors required are co-determined by imaging parameters of the x-ray examination apparatus. Employing a multitude of sets of weighting factors or simple parametrisations of weighting factors yields only a partially satisfactory solution to this problem.

SUMMARY OF THE INVENTION

It is inter alia an object of the invention to provide an x-ray examination apparatus comprising means for real-time correction for scattered-radiation effects in the x-ray image.

To achieve this, an x-ray examination apparatus in accordance with the invention is characterised in that the means for correcting scattered-radiation effects in an x-ray image comprises signalling circuit means for providing selection signals, and video signal separation means for deriving, from the video signal generated by the x-ray detector, by using the selection signals, a first separated video signal derived from x-ray intensities at positions behind transparent parts of the scattered-radiation grid and a second separated video signal derived from to x-ray intensities at positions behind absorbing parts of the scattered-radiation grid, and in that the device further comprises subtraction means for subtracting the first separated video signal from the second separated video signal.

A spatial intensity distribution of an x-ray beam attenuated by an object contains a component which does not contribute to imaging inter alia because in addition to attenuation of the x-ray beam in the propagation direction also scattering from electrons in the attenuating object occurs. The attenuated x-ray intensity therefore consists of an intensity of primary radiation, corresponding to a decrease of the intensity of the radiation of an x-ray beam in the propagation direction and of an intensity of scattered-radiation, corresponding to the x-rays scattered in the object. Rays of primary x-radiation have propagation directions of rays emitted by the x-ray source. Rays of scattered x-radiation have random directions of propagation.

The scattered-radiation grid comprises a laminated structure so as to avoid to some extent scattered-radiation, having random directions of propagation, to pass the scattered-radiation grid. The laminations consist of x-ray absorbing material and x-ray-transparent channels being formed in between the absorbing laminations are in a direction of a beam path of x-radiation generated by the x-ray source. Immediately behind the absorbing parts of the scattered-radiation grid x-radiation intensity is predominantly due to scattered-radiation, whereas immediately behind transparent parts of the scattered-radiation grid x-ray intensity is due to both scattered-radiation and primary radiation.

Because spatial variations of scattered-radiation are predominantly slowly varying, scattered-radiation intensity immediately behind an absorbing part of the scattered-radiation grid and scattered intensity immediately behind a transparent part of the scattered-radiation grid, said absorbing part and transparent part being close to each other, are substantially equal.

Because the scattered-radiation grid consists of alternate x-ray absorbing laminations and x-ray transparent channels, an image generated by an imaging system comprising such a scattered-radiation grid contains a rapidly spatially varying pattern. Image information relating to an object examined by x-radiation has spatial variations which vary more slowly than the pattern associated with the scattered-radiation grid. Consequently, extraction of the high-frequency part of the video signal generated by the x-ray examination apparatus provides information concerning positions of absorbing parts of the scattered-radiation grid. From said information concerning the scattered-radiation grid, signalling information is generated for discriminating between radiation detected behind a transparent part or behind an absorbing part of the scattered-radiation grid.

From the video signal, generated by the x-ray detector there is obtained, by using said signalling information, a first separated video signal pertaining to intensities of scattered x-radiation and a second separated video signal corresponding to sums of intensities of scattered-radiation and of primary x-radiation. By substraction of the first separated video signal from the second separated video signal, there is obtained a video signal for an x-ray image which is corrected for perturbations due to scattered-radiation.

A preferred embodiment of a device in accordance with the invention is characterised in that the signalling circuit means comprises a high-pass filter and a double pulse generator.

The high-pass filter separates a high-frequency part from the video signal associated with the total intensities of primary and scattered-radiation at positions behind the scattered-radiation grid. Said high-frequency part pertains to the structure of the scattered-radiation grid. The scattered-radiation grid is commonly referred to as a 'Bucky grid'. Therefore the high-frequency part of the video signal generated by the x-ray detector will be referred to hereinafter as a 'Bucky-signal'. From a Bucky-signal a first series of voltage pulses is constructed, each of the pulses of the first series being associated with a position behind an absorbing part of the scattered-radiation grid. Correspondingly, a second series of voltage pulses is constructed from the Bucky-signal, each of the pulses of said second series being associated with a position behind a transparent part of the scattered-radiation grid. Thus, the pulse series derived from a Bucky-signal are employed as selection signals for separating the video signal generated by the x-ray source. Because the first series of voltage pulses is an approximately periodic function of time, the second series of voltage pulses can be obtained by shifting the first series of voltage pulses in time over half the period of the first series of voltage pulses. In other words; because of periodicity, the first series of voltage pulses has a phase, the second series of voltage series is produced by shifting the phase of the first series of voltage pulses over 180°.

A further preferred embodiment of a device in accordance with the invention is characterised in that the video signal separating means comprises synchronous detection means.

The video signal generated by the x-ray detector comprises of signal amplitudes, e.g. voltages, being in correspondence with intensity values in the x-ray image. The video signal generated by the x-ray detector, together with the first and second series of voltage pulses are fed into a synchronous detection means. Signal amplitudes of the video signal generated by the x-ray detector coinciding at the synchronous detection means with voltage pulses of the first pulse series are combined into a first separated video signal. Similarly, a second separated video signal is formed by signal amplitudes of the video signal generated by the x-ray detector coinciding at the synchronous detection means with voltage pulses of the second pulse series. Thus, a first separated video signal is formed having signal amplitudes in correspondence with primary radiation intensities containing image information, together with scattered-radiation intensities. A second separated video signal is formed having signal amplitudes substantially in correspondence with scattered-radiation intensities only. Hence, by subtraction of the second separated video signal from the first separated video signal there is obtained a video signal comprising signal amplitudes in correspondence with x-ray image intensities and which is corrected for perturbations due to scattered-radiation.

A further preferred embodiment of a device in accordance with the invention is characterised in that the synchronous detection means comprises a gate circuit.

The operation of a gate circuit consists of transmitting some signal provided that another signal is present. Therefore, a gate circuit is suited for use as the synchronous detection means.

A further preferred embodiment of a device in accordance with the invention is characterised in that the device also comprises a delay means for delaying the video signal generated by the x-ray detector prior to supplying said video signal to the video signal separation means.

Electronic performance of operations for generating pulse series for discriminating between signal amplitudes containing only scattered-radiation intensities and signal amplitudes containing both image intensities and scattered-radiation intensities, as discussed above will consume some amount of time. The video signal generated by the x-ray detector is appropriately delayed by the delay means in a device according to the invention, so that the video signal generated by the x-ray detector is fed into the synchronous detection means simultaneously with relevant voltage pulses of said first and second series.

A still further preferred embodiment of a device in accordance with the invention is characterised in that the device also comprises a bypass circuit, and further signal generating means for activating said bypass circuit in dependence of the presence of selection signals.

In a number of circumstances of operating the device, the Bucky-signal is not available. This may occur e.g. when an x-ray diaphragm positioned in the x-ray beam path is closed. Furthermore, the Bucky-signal is absent in parts of the x-ray image that pertain to extremely strong absorption in the object which is examined. Whenever there is no Bucky-signal available, it is evident that the synchronous detection means cannot provide a video signal for an x-ray image corrected for perturbations due to scattered-radiation. The absence of a Bucky-signal is detected by the signalling circuit means and then a signal is generated for activating a bypass circuit. When the bypass circuit is activated, then the video signal generated by the x-ray detector is employed directly as an output video signal of the device.

These and other aspects of the invention will become apparent from and elucidated with reference to the embodiments described hereinafter and with reference to the accompanying drawing.

DETAILED DESCRIPTION OF THE PREFERRED EMBODIMENT

Figure 1:
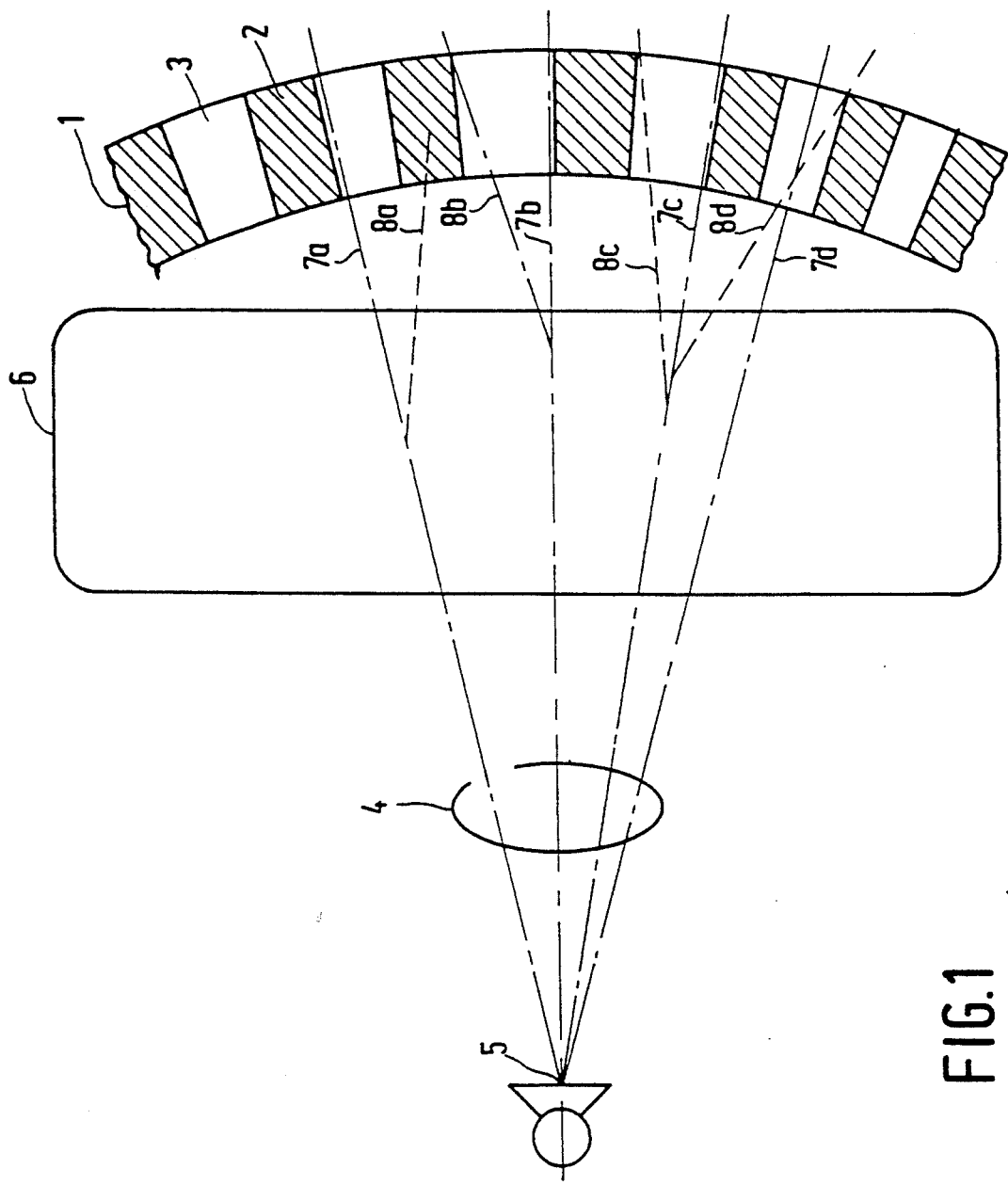
FIG. 1 shows primary x-radiation and scattered x-radiation passing a scattered-radiation grid.

FIG. 1 shows primary x-radiation and scattered x-radiation passing a scattered-radiation grid 1, comprising x-ray absorbing parts formed by laminations 2. In between the laminations there are x-ray transparent parts formed by channels 3. Intensities of x-rays 4 that are emitted by the x-ray source 5 can be decreased by an x-ray absorbing object 6, or the x-rays can be scattered from e.g. electrons, within the object 6. After having passed through the object 6, the propagation direction of the attenuated primary x-radiation remains the same as the direction in which they were emitted by the x-ray source. The directions of longitudinal axes of respective channels in the scattered-radiation grid are arranged such that attenuated primary rays 7a–d pass through respective channels along directions of longitudinal axes of said channels. When x-rays are incident on the object 6, they can be scattered within the object and scattered x-rays 8a–d have propagation directions that are different from the propagation directions of incident x-radiation. Scattered x-rays, such as e.g. an x-ray marked by reference numeral 8a can be blocked by the absorbing laminations, or scattered rays, such as e.g. x-rays marked by reference numerals 8b–d may pass through the transparent channels. A scattered x-ray passing through a transparent channel in the scattered-radiation grid may or may not have a propagation direction to some extent along the longitudinal axis of the relevant channel. Therefore, the scattered x-rays will appear in positions behind x-ray absorbing parts of the scattered-radiation grid as well as in positions behind x-ray transparent parts of the scattered-radiation grid. On the other hand, primary radiation will only appear behind the x-ray transparent parts of the scattered-radiation grid.

Figure 2:
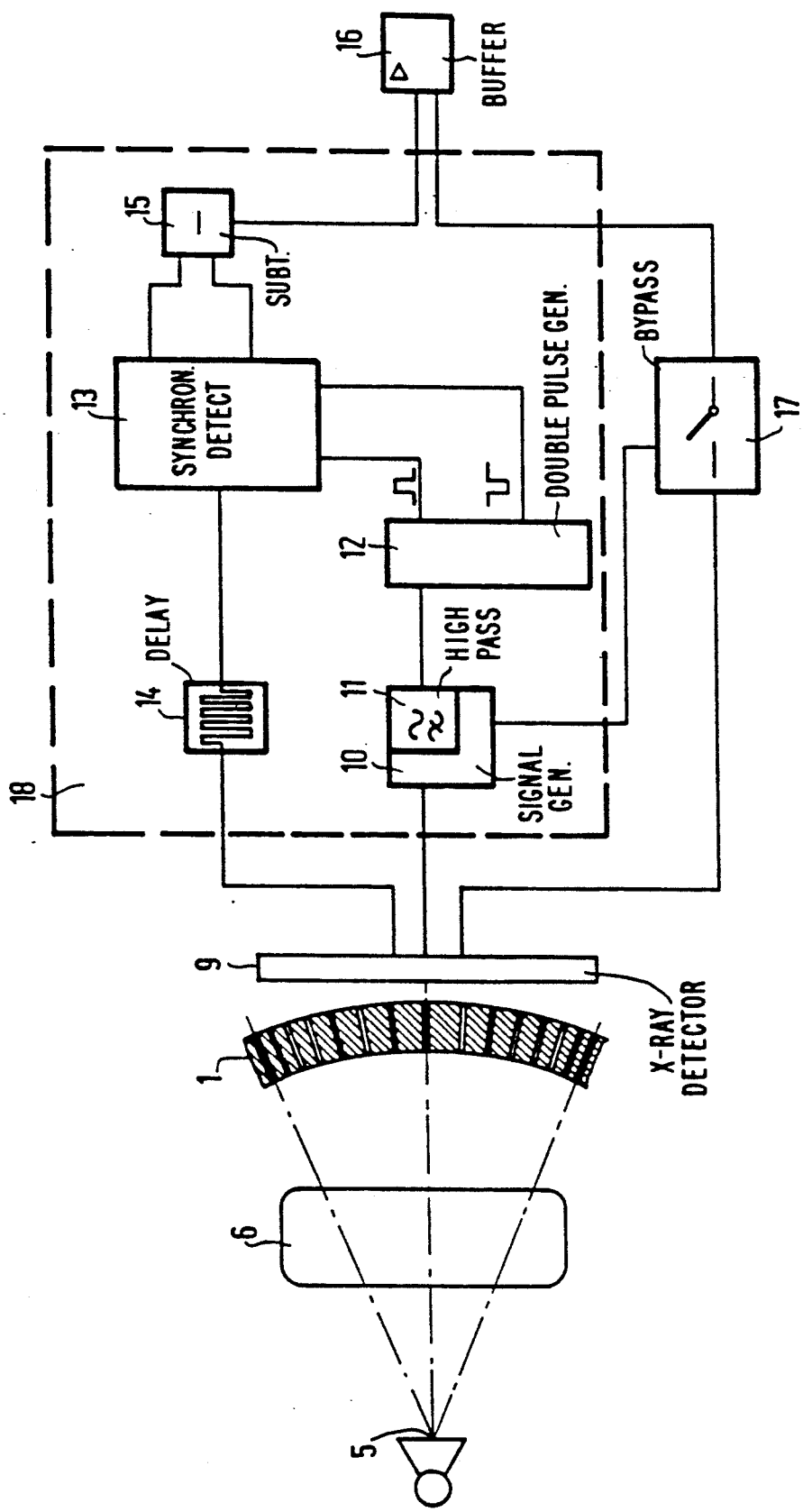
FIG. 2 shows a block scheme of a preferred embodiment of an x-ray examination apparatus according to the invention.

FIG. 2 shows a block diagram of a preferred embodiment of an x-ray examination apparatus in accordance with the invention. The x-ray source 5 is provided for generating x-radiation for irradiating an object 6, notably a patient, for x-ray examination. The x-radiation is attenuated and scattered by the object. The attenuated primary x-radiation passes through the scattered-radiation grid 1. The scattered-radiation is partially absorbed by the absorbing laminations and is also partially transmitted through the transparent channels of the scattered-radiation grid. An x-ray detector 9 detects both attenuated radiation and scattered-radiation which have passed the scattered-radiation grid. A high-frequency component of an output video signal of the x-ray detector corresponds to rapid intensity variations of the x-ray intensity that is due to the periodic structure of the scattered-radiation grid. The high-frequency component will be referred to hereinafter as a 'Bucky-signal'. The Bucky-signal is obtained from the video signal provided by the x-ray detector by way of a high-pass filter 11. The high-pass filter 11 is part of a signal generating means 10. The Bucky-signal is fed into a double-pulse generator 12. The double-pulse generator produces two periodic series of signal pulses, each of the pulse series having a substantially same period. The two series of signal pulses are mutually shifted over half a period and serve as selection signals produced by the signalling circuit constituted by the high-pass filter 11 and the double-pulse generator 12. The two signal pulse series are subsequently fed into a video signal separation means formed by synchronous detection means 13. For example, the synchronous detection means comprises a gate circuit. The video signal generated by the x-ray detector is supplied to a delay means 14. Thereby an appropriately delayed video signal is produced that itself is fed into the synchronous detection means, simultaneously with the signal pulse series provided by the double-pulse generator 12. From the delayed video signal supplied by the delay means 14, the synchronous detection means generates two separated video signals. A first separated video signal produced by the synchronous detection means contains signal amplitudes corresponding to intensities of scattered x-radiation, appearing behind the laminations 2, a second separated video signal produced by the synchronous detection means contains signal amplitudes corresponding to sums of intensities of scattered x-radiation and primary radiation, appearing behind the channels 3. The two separated video signals produced by the synchronous detection means are subtracted from one another by a subtraction means 15. Thus, a video signal comprising signal amplitudes of x-ray intensities for an x-ray image, which is corrected for perturbations due to scattered-radiation is supplied by the subtraction means 15. In order to subtract video signals appropriately, e.g. subtraction involves delaying the second separated video signal relatively to the first separated video signal, so that signal amplitudes corresponding to intensities of scattered radiation are subtracted from signal amplitudes corresponding to sums of intensities of scattered and primary radiation, such that said respective intensities pertain to portions behind neighbouring absorbing lamination and transparent channels of the scattered-radiation grid. Or, a further low-pass filter may be employed to isolate a low-frequency component of the first separated video signal and subtracting that low-frequency component from the second separated video signal. Finally, the video signal provided by the subtraction means is fed into an output buffer circuit 16. Consequently, means 18 for correcting scattered-radiation effects in an x-ray image comprises a combination, as described hereinbefore, of the synchronous detection means 13, the double pulse generator 12, the high-pass filter 11, the signal generating means 10, the delay means 14 and the subtraction means 15.

When there is no Bucky-signal available, its absence is detected by way of the signal generating means 10 and a signal is generated by the signal generating means 10 for activating a bypass circuit 17. When the bypass circuit is activated, then the video signal generated by the x-ray detector 9 is supplied directly to the output buffer circuit 16.

I claim:

1. An x-ray examination device comprising an x-ray source, a scattered-radiation grid, an x-ray detector for converting x-ray intensities constituting the x-ray image into a video signal containing information for producing a visible image and the x-ray examination apparatus also comprising means for correcting scattered-radiation effects in an x-ray image, characterised in that the means for correcting scattered-radiation effects in an x-ray image comprises signalling circuit means for providing selection signals, and video signal separation means for deriving, from the video signal generated by the x-ray detector, by using the selection signals a first separated video signal derived from x-ray intensities at positions behind transparent parts of the scattered-radiation grid and a second separated video signal derived from x-ray intensities at positions behind absorbing parts of the scattered-radiation grid, and in that the device further comprises subtraction means for subtracting the first separated video signal from the second separated video signal.

2. A device as claimed in claim 1, further characterised in that the signalling circuit means comprises a high-pass filter and a double pulse generator.

3. A device as claimed in claim 1, further characterised in that the video signal separating means comprises synchronous detection means.

4. A device as claimed in claim 3, further characterised in that the synchronous detection means comprises a gate circuit.

5. A device as claimed in claim 1, further characterised in that the device also comprises a delay means for delaying the video signal generated by the x-ray detector prior to supplying said video signal to the video signal separation means.

6. A device as claimed in claim 1, further characterised in that the device also comprises a bypass circuit, and further signal generating means for activating said bypass circuit in dependence of the presence of selection signals.

7. A device as claimed in claim 2, further characterized in that the video signal separating means comprises synchronous detection means.

8. A device as claimed in claim 7, further characterized in that the synchronous detection means comprises a gate circuit.

9. A device as claimed in claim 2, further characterized in that the device also comprises a delay means for delaying the video signal generated by the x-ray detector prior to supplying said video signal to the video signal separation means.

10. A device as claimed in claim 3, further characterized in that the device also comprises a delay means for delaying the video signal generated by the x-ray detector prior to supplying said video signal to the video signal separation means.

11. A device as claimed in claim 4, further characterized in that the device also comprises a delay means for delaying the video signal generated by the x-ray detector prior to supplying said video signal to the video signal separation means.

12. A device as claimed in claim 8, further characterized in that the device also comprises a delay means for delaying the video signal generated by the x-ray detector prior to supplying said video signal to the video signal separation means.

13. A device as claimed in claim 2, further characterized in that the device also comprises a bypass circuit, and further signal generating means for activating said bypass circuit in dependence of the presence of selection signals.

14. A device as claimed in claim 3, further characterized in that the device also comprises a bypass circuit, and further signal generating means for activating said bypass circuit in dependence of the presence of selection signals.

15. A device as claimed in claim 12, further characterized in that the device also comprises a bypass circuit, and further signal generating means for activating said bypass circuit in dependence of the presence of selection signals.

* * * * *